(12) United States Patent
Shoda et al.

(10) Patent No.: US 6,382,836 B1
(45) Date of Patent: May 7, 2002

(54) ROLLING BEARING

(75) Inventors: Yoshio Shoda; Jun Liu, both of Kanagawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 09/584,130

(22) Filed: May 31, 2000

(30) Foreign Application Priority Data

May 31, 1999 (JP) ............................................ 11-152757

(51) Int. Cl.[7] .............................................. F16C 19/00
(52) U.S. Cl. .......................... 384/47; 384/447; 384/619
(58) Field of Search .......................... 384/47, 447, 619, 384/53, 55

(56) References Cited

U.S. PATENT DOCUMENTS

| | | |
|---|---|---|
| 1,235,116 A | 7/1917 | Coppage |
| 4,606,654 A | 8/1986 | Yatsu et al. ................. 384/447 |
| 4,648,729 A | 3/1987 | Jones ......................... 384/615 |
| 4,746,232 A | 5/1988 | Gugel ........................ 384/619 |
| 4,974,972 A | 12/1990 | Boosler, Jr. et al. ........ 384/447 |

FOREIGN PATENT DOCUMENTS

| | | | |
|---|---|---|---|
| DE | 6920874 | 12/1969 | |
| DE | 33 08735 A1 | 10/1983 | ........... F16C/19/36 |
| DE | 36 14390 A1 | 10/1987 | ........... F16C/33/61 |
| DE | 43 34 195 A1 | 3/1994 | ........... F16C/33/30 |
| JP | 8-1294 | 1/1996 | ........... F16C/33/36 |
| JP | 9-126233 | 5/1997 | ........... F16C/19/36 |

OTHER PUBLICATIONS

Patent Abstract of Japan 09126233 May 13, 1997.

*Primary Examiner*—Lenard A. Footland
(74) *Attorney, Agent, or Firm*—Sughrue Mion, PLLC

(57) ABSTRACT

Into a raceway groove 3 formed between outer and inner races 1 and 2, there are incorporated a plurality of rolling elements 5, 5 of which outside diameters 5a serving as the rolling contact surfaces thereof each has a curvature in the axial direction as well and also each of which has a radius smaller than the radius of the raceway surfaces of the outer and inner races. The rolling elements 5 are arranged in such a manner that the mutually adjoining rolling elements 5, 5 cross each other alternately and also that the outside diameters 5a, 5a of the respective rolling elements 5, 5 are always contacted at two points with the raceway surfaces 1a, 1b of one race 1 and the raceway surfaces 2b, 2a of the other race 2.

13 Claims, 14 Drawing Sheets

US 6,382,836 B1

ROLLING BEARING

BACKGROUND OF THE INVENTION

The present invention relates to a bearing which is capable of receiving a radial load, axial loads in two directions, and a moment load and also which is usable in an industrial machine, a robot, a medical instrument, a semiconductor/liquid crystal manufacturing apparatus, an optical instrument, an opto-electronic instrument, and so on.

Conventionally, as a bearing which is capable of receiving a radial load, axial loads in two directions, and a moment load, there are known a cross roller bearing and a four-point contact ball bearing. In the conventional cross roller bearing, between an inner race 100 and an outer race 200, there is incorporated a cylindrical-shaped roller 300 (see FIG. 18). On the other hand, in the conventional four-point contact ball bearing, between an inner race 100 and an outer race 200, there is incorporated a ball 400 (see FIG. 19).

However, in the conventional cross roller bearing and four-point contact ball bearing, there are found the following problems to be solved.

(1) In the case of the cross roller bearing, since a rolling element is a cylindrical-shaped roller 300 and the rolling contact surface 301 of the roller 300 is line contacted with a raceway groove 500, there is produced large torque.

(2) In the case of the four-point contact ball bearing, because a rolling element is a ball, when the bearing receives a pure axial load or when an axial load is dominant over a radial load, the four-point contact ball bearing produces smaller torque than the cross roller bearing of the same size. On the other hand, when a radial load is dominant over an axial load or when the bearing receives a pure radial load, each ball 400 is contacted with a raceway groove 500 at four points 401, 401, 401 and 401 and, therefore, there occurs large spin slippage between the ball 400 and raceway groove 500, which results in large torque.

SUMMARY OF THE INVENTION

The present invention aims at solving the above problems found in the conventional cross roller bearing and four-point contact ball bearing. Accordingly, it is an object of the invention to provide a rolling bearing which can control spin slippage between a rolling element and a raceway groove and can reduce rolling resistance to realize low torque, thereby being able to receive a radial load, axial loads in two directions, and a moment load.

In attaining the above object, according to the invention, there is provided a rolling bearing, wherein a plurality of rolling elements are incorporated between a pair of races, each of the two races has a raceway groove defined by two raceway surfaces each having a radius larger than the radius of each of the rolling elements, the outside diameter of each rolling element serving as the rolling contact surface thereof has a curvature in the axial direction of the rolling element as well, the mutually adjoining ones of the rolling elements are arranged in such a manner that they cross each other alternately, and the outside diameter of each rolling element is always contacted at two points with the raceway surfaces of one of the races as well as with the raceway surfaces of the other.

The above-mentioned object can also be achieved by a rolling bearing, according to the present invention, comprising:

a first race having a race way groove defined by two raceway surfaces;

a second race mated with the first race, the second having a race way groove defined by two raceway surfaces; and a plurality of rolling elements rotatably incorporated between the first and second races, each of the rolling elements having a rolling contact peripheral surface defined by rotating a curved bus line about its rotation axes, the curved bus line having a sole predetermined curvature which is smaller than any one of the radius of raceway surfaces of the first and second races, wherein the rolling contact surface of each of the rolling element is always contact contacted at two points with the raceway surfaces of the first and second races, the two points are consisted of a first point positioned at one of the two raceway surfaces of the first race and a second point positioned at one of the two raceway surfaces of the second race, and the mutually adjoining ones of the rolling elements are arranged in such a manner that their rotation axes each other alternately.

DETAILED DESCRIPTION OF THE PREFERRED EMBODIMENTS

Figure 1:
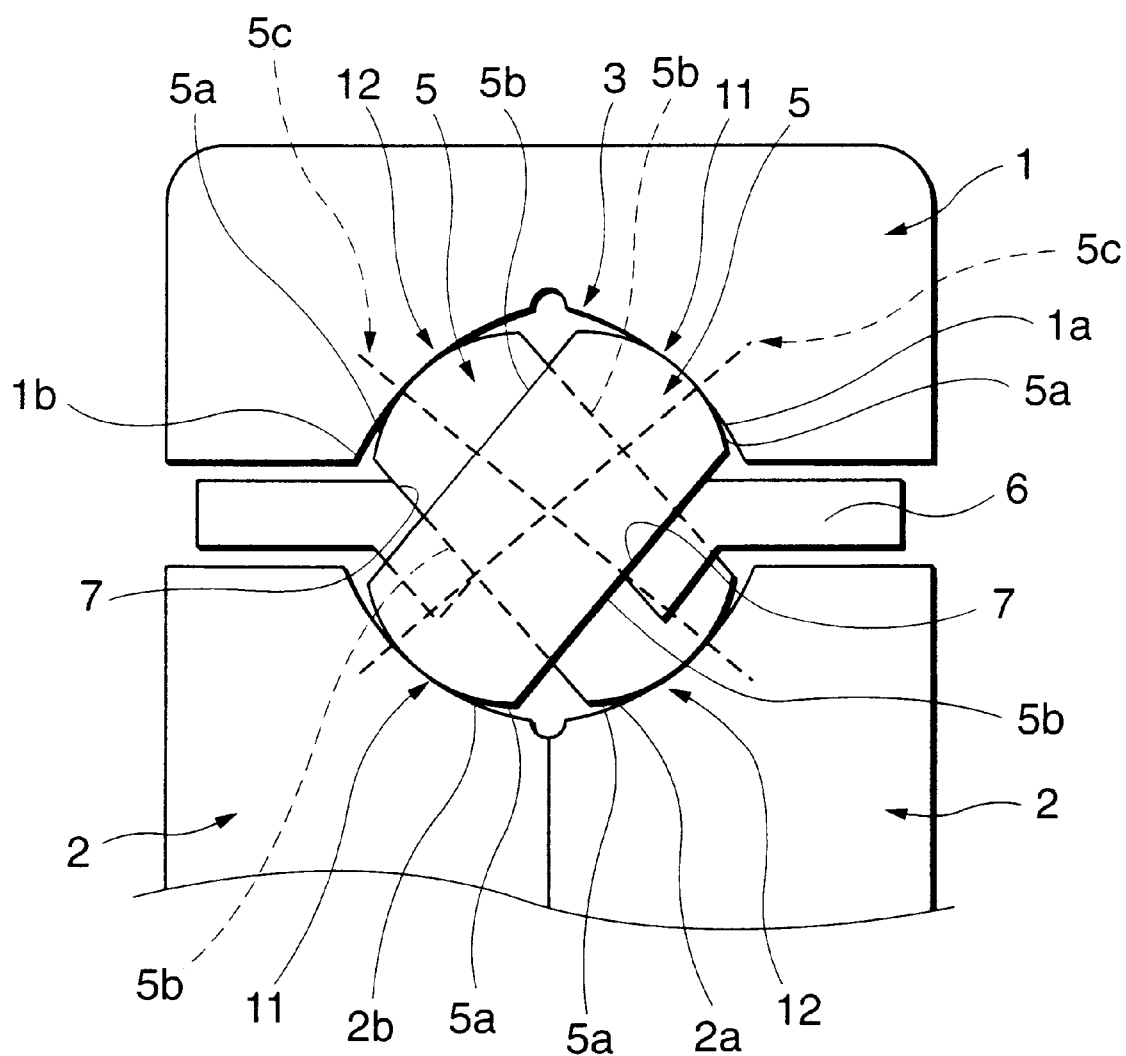
FIG. 1 is a longitudinal section view, omitted in part, of a rolling bearing according to a first embodiment of the invention.

Now, description will be given below of a mode for carrying out a rolling bearing according to the invention with reference to the accompanying drawings.

By the way, the present mode is just a mode disclosed for the purpose of explanation of a rolling bearing according to the invention, that is, the invention is not limited to the present mode at all but various changes are possible without departing from the scope of the invention.

The rolling bearing comprises one race (as an outer race) 1, the other race (as an inner race) 2, a raceway groove 3 defined by and between the inside diameter of the race 1 and the outside diameter of the race 2, and a plurality of rolling elements 5, 5 - - - respectively incorporated in the raceway groove 3.

The two races 1 and 2 are structured such that a raceway groove 3 having a desired shape can be formed by raceway surfaces 1a, 1b and 2a, 2b respectively formed on the inside diameter of one race (outer race) 1 and on the outside diameter of the other race (inner race) 2. As the rolling bearing, there maybe used a rolling bearing of a type that one or both of the two races 1 and 2 is or are divided at the center thereof into two raceway sections in the axial direction thereof, or a rolling bearing of a type that neither of the two races 1 and 2 is divided.

Also, as the rolling bearing of the two-division type, there is available a rolling bearing which can be assembled in an integral body using a bolt, or a rivet 4.

The race groove 3 is defined by the raceway surfaces 1a, 1b and 2a, 2b each having a radius larger than the radius of each of the rolling elements 5.

Each of the raceway surfaces 1a, 1b and 2a, 2b may have an arbitrary shape such as a shape having an arch-shaped section, a V-like shape, a curved shape, or a linear shape, provided that it is suitable for the rolling motion of the rolling element 5. That is, the shape of the raceway surface is not limited to a specific shape; however, for example, there can be used a Gothic arch shape.

Figure 2:
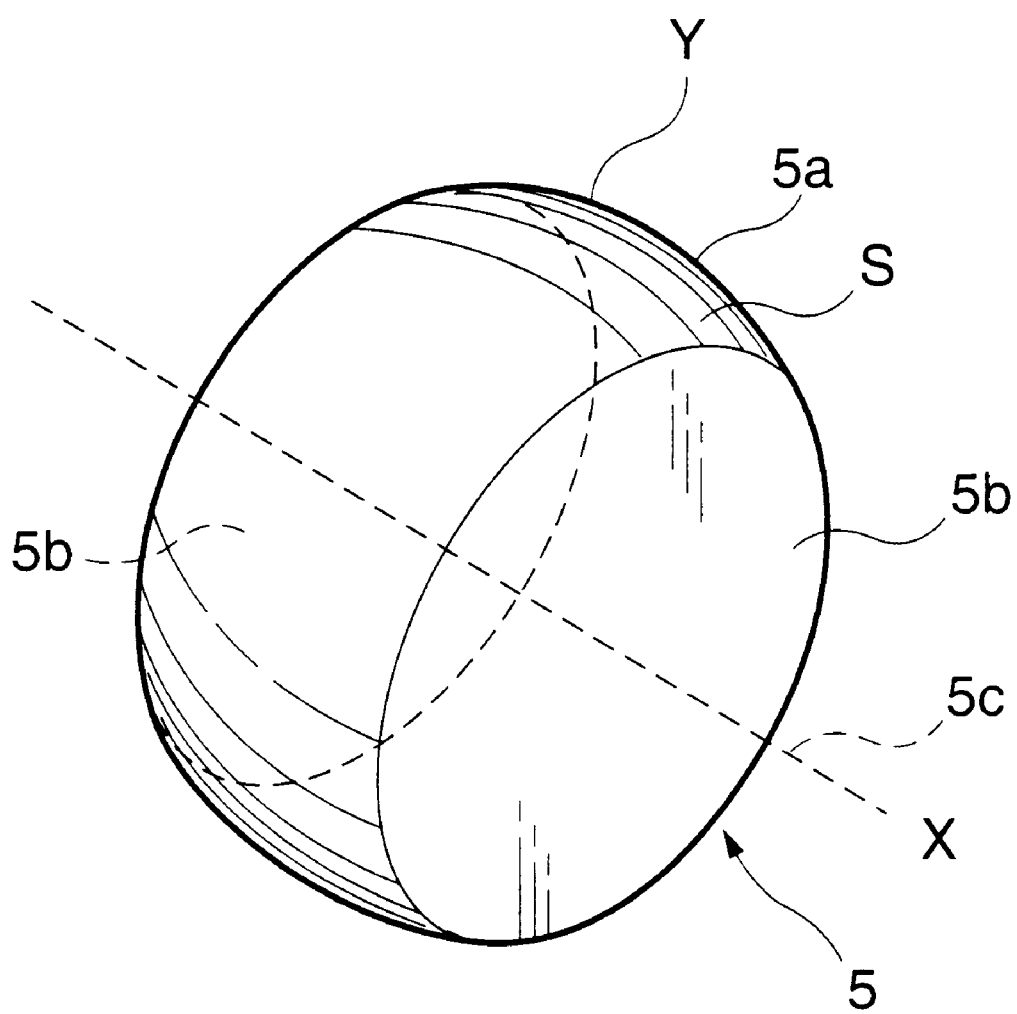
FIG. 2 is an enlarged perspective view of an embodiment of a rolling element employed in the invention.

Each of the rolling elements 5 may have an arbitrary shape, provided that its outside diameter 5a serving as its rolling contact surface has at least one curvature in the axial direction of the rolling element 5 a radius of which is smaller than the radius of the respective raceway surfaces 1a, 1b and 2a, 2b. In other words, as shown in FIG. 2, each of said rolling elements 5 has a rolling contact peripheral surface S defined by rotating a curved bus line Y about its rotation axes X. The curved bus line Y has at least one predetermined curvatures each of which is smaller than any one of the radius of raceway surfaces of the respective raceway surfaces 1a, 1b and 2a, 2b.

However, in this embodiment, the curved bus line Y has a sole predetermined curvature smaller than any one of the radius of raceway surfaces of the respective raceway surfaces 1a, 1b and 2a, 2b.

The rolling elements 5 are arranged in such a manner that the mutually adjoining ones of the rolling elements 5 cross each other alternately, while the respective outer diameters 5a of the rolling elements 5 are always contacted at two points with the raceway surfaces 1a, 1b of one race 1 and the raceway surfaces 2a, 2b of the other race 2.

For example, the rolling element 5 may have a structure consisting of a top-and-bottom-cut-shaped ball having a set of mutually opposing surfaces 5b and 5b (that is, a structure obtained when the upper and lower portions of a ball are cut to thereby form the mutually opposing surfaces 5a and 5b; this expression will also be used hereinafter). The rolling elements 5, 5, - - - are respectively incorporated into the raceway groove 3 in such a manner that their respective rotation axes 5c perpendicular to their associated mutually opposing surfaces 5b and 5b cross each other and, at the same time, the respective outside diameters 5a of the rolling elements 5 are always contacted at two points with the raceway surfaces 1a, 1b of one race 1 and the raceway surfaces 2a, 2b of the other race 2.

The cut widths of the upper and lower portions of the rolling element 5 are not limited to any specific dimensions, and these two cut widths may be equal to each other or may not; and, a ratio between the two cut widths can be selected arbitrarily without departing from the scope of the invention. In other words, the mutually opposing surfaces 5b and 5b of the rolling element 5 may be set symmetric or asymmetric; that is, either of the symmetric and asymmetric settings falls within the scope of the invention.

By the way, the whole shape of the rolling element 5, the presence or absence of the mutually opposing surfaces 5b, 5b, and the size of the curvature of the outside diameter 5a in the axial direction thereof are not limited to the above-described ones at all, but they can be changed arbitrarily without departing from the scope of the invention. That is, for example, the rolling element 5 may include, instead of the mutually opposing surfaces 5b, 5b, two surfaces not parallel to each other and may also have its own rotation axis 5c which is perpendicular to these two non-parallel surfaces.

Also, while the rolling elements 5, 5, - - - are incorporated in such a manner that the rotation axes 5c, 5c of the two mutually rolling elements 5, 5 respectively perpendicular to their associated mutually opposing surfaces 5b, 5b and 5b, 5b cross each other alternately, the crossing manner thereof may be at right angles or may not.

The crossing manner of the rolling elements 5 is not limited to a specific crossing manner, provided the mutually crossing rolling elements 5 are equal in total number on the two sides thereof. That is, the rolling elements 5 may cross each other one to one; or they may cross in the manner of two, one, one, and two, provided that the mutually crossing rolling elements 5 are equal in total number on the two sides thereof. Either of the crossing manners falls within the scope of the invention.

The movements of the respective rolling elements 5, 5 can be guided by a retainer 6, 6' or a separator (spacer) B.

The shape of the retainer 6, 6' or separator (spacer) 8 is not limited to a specific shape, provided that it includes hold portions 7, - - - , pockets 13, - - - or grooves 9, 9. That is, the shape of the retainer 6 or separator (spacer) 8 can be selected and changed arbitrarily without departing from the scope of the invention. In addition, the guiding system of the retainer 6, 6' is not limited to a specific one as described above. An inner race guiding type, an outer race guiding type or a rolling element guiding type can also be utilized instead of it. Further, a construction of the retainer 6, 6' is not limited to a specific one as described above. Namely, not only a single unit type but also a divided race components type can be utilized.

For example, in the case of the retainer 6, in the peripheral direction thereof, there are alternately formed two hold portions 7, 7 (or the pockets 13, - - - of the retainer 6') into which the mutually adjoining rolling elements 5, 5 can be incorporated in such a manner that, as described above, the rotation axes 5c, 5c thereof perpendicular to their associated mutually opposing surfaces 5b, 5b and 5b, 5b cross each other alternately.

The separator 8 has a diameter smaller than the diameter of each rolling element 5 and, in its mutually opposing surfaces 10, 10, there are formed two recess-shaped arc grooves 9, 9 in a mutually crossing manner, which are respectively capable of holding the mutually adjoining rolling elements 5, 5 in such a manner that, as described above, the rotation axes 5c, 5c thereof perpendicular to their associated mutually opposing surfaces 5b, 5b and 5b, 5b cross each other.

The curvature of the arc groove 9 can be set arbitrarily, that is, it maybe set substantially equal to or larger than the curvature of the outside diameter 5a of the rolling element 5.

The manner of application of a preload between the rolling element and raceway surface is not limited to a specific one. That is, the preload may be applied or not in the bearing manufacturing stage, either of which applications manners falls within the scope of the invention.

As a material making the races 1, 2 and the rolling elements 5 of the rolling bearing, a bearing steel is usually used. However, another material such as stainless steel, ceramic or the like, which is suitable for increasing wear resistance or heat resistance, is also selectable in accordance with environment of usage of the rolling bearing.

In addition, as a retainer 6, 6' employed in the present invention, a machined retainer, a pressed retainer, a resin retainer or the like is also selectable in accordance with needs. Accordingly, a metal material (for example, brass, steel or the like) or a synthetic resin (for example, polyamide 66 (nylon 66), polyphenylene sulfide (PPS) or the like) suitable therefor is selectively utilized.[Embodiments]

Next, description will be given below of the concrete embodiments of a rolling bearing according to the invention with reference to the accompanying drawings.

First Embodiment

Now, FIG. 1 shows a first embodiment of a rolling bearing according to the invention.

Each of the rolling elements 5, 5, as shown in FIG. 2, consists of a top-and-bottom-cut-shaped ball including a set of mutually opposing surfaces 5b and 5b; and the rolling element 5 is incorporated into a raceway groove 3 formed between an outer race 1 formed integral with the rolling bearing and two divided inner races 2, 2.

According to the present embodiment, the raceway groove 3 is formed in a Gothic arch defined by the raceway surfaces 1a, 1b and 2a, 2b of the outer and inner races respectively having a radius larger than the radius of the rolling element 5; and, the mutually opposing surfaces 5b and 5b of the rolling element (top-and-bottom-cut-shaped ball) 5 are formed so as to have a symmetry.

The rotation axes 5c, 5c of the rolling elements 5, 5 set perpendicular to their associated mutually opposing surfaces 5b, 5b and 5b, 5b are arranged so as to cross each other alternately, and the movements of the rolling elements 5, 5 are guided by the hold portions 7, 7 of a retainer 6.

In the case of the retainer 6, in the peripheral direction thereof, there are alternately formed two hold portions 7, 7 into which the mutually adjoining rolling elements 5, 5 can be incorporated in such a manner that, as described above, the rotation axes 5c, 5c thereof perpendicular to their associated mutually opposing surfaces 5b, 5b and 5b, 5b cross each other alternately.

Therefore, according to the first embodiment, the outside diameter 5a of the rolling element 5 is contacted at two points (the contact points are designated by 11, 11) with the raceway surface 1a of the outer race 1 and the raceway surface 2b of the inner race 2 which are disposed opposed to each other, while the mutually adjoining rolling elements 5 are respectively contacted (the contact points are designated by 12, 12) with the raceway surface 1b of the outer race 1 and the raceway surface 2a of the inner race 2.

Since the contact angles of the rolling elements 5, 5 cross each other alternately, the single bearing is able to receive a radial load, axial loads in two directions, and a moment load.

Also, because one rolling element 5 is point contacted only at the two points (11, 11) with the raceway surfaces 1a, 2b and the other rolling element 5 is point contacted only at the two points (12, 12) with the raceway surfaces 1b, 2a, there can be removed such large spin as in the conventional four-point contact bearing.

Further, since the manner of contact between the rolling elements 5, 5 and outer and inner races 1, 2 is the same as in an ordinary ball bearing, when compared with a cross roller bearing, there can be produced low roller resistance, which makes it possible to realize low torque.

Second Embodiment

Figure 3:
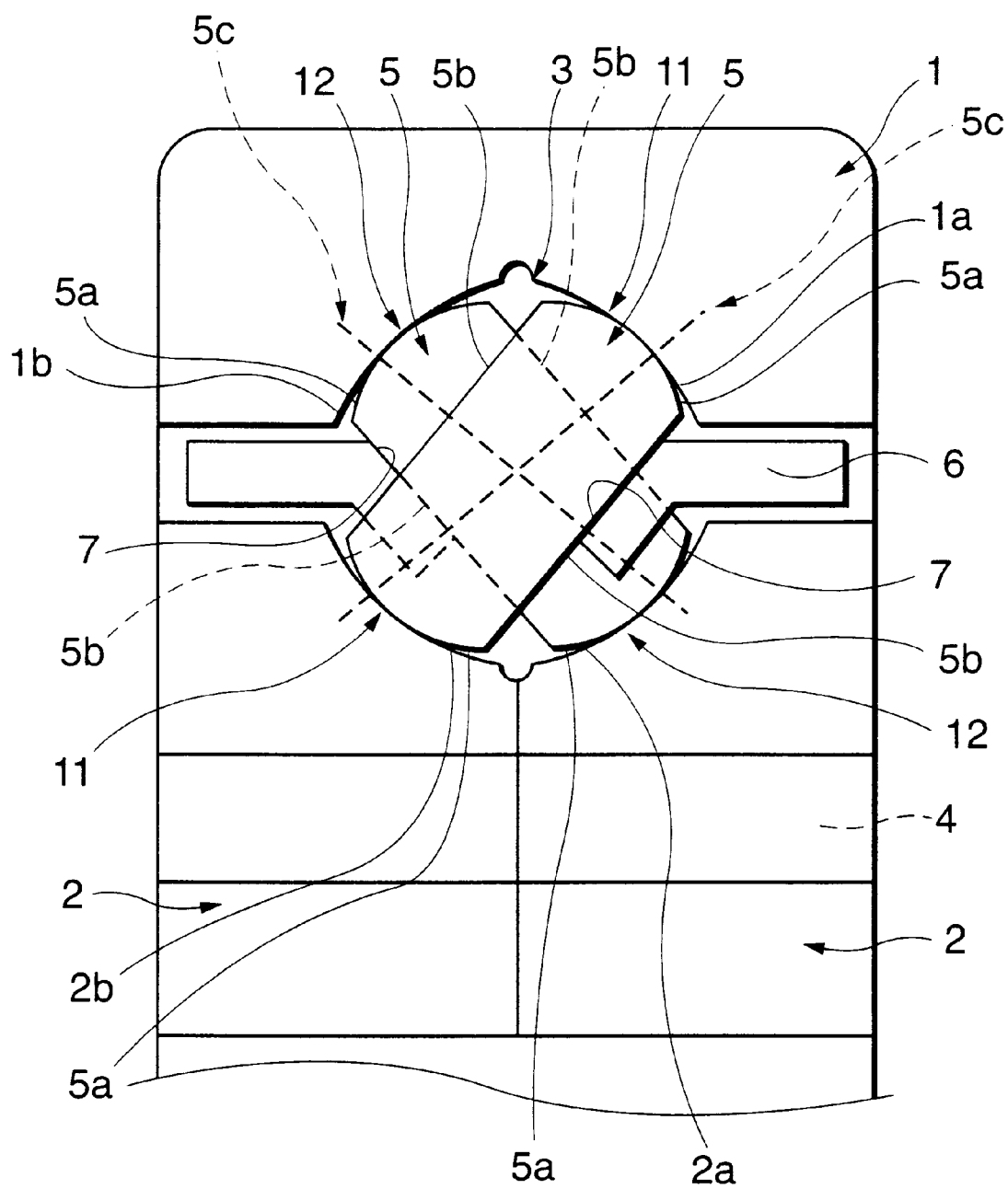
FIG. 3 is a longitudinal section view, omitted in part, of a rolling bearing according to a second embodiment of the invention.

Now, FIG. 3 shows a second embodiment of a rolling bearing according to the invention. In the present embodiment, the two divided inner races 2 and 2 are fixed together by a bolt or a rivet 4 to thereby eliminate the need for adjustment of a preload or a clearance between them.

The other remaining structures and operation effects of the present embodiment are the same as those of the first embodiment.

Third Embodiment

Figure 4:
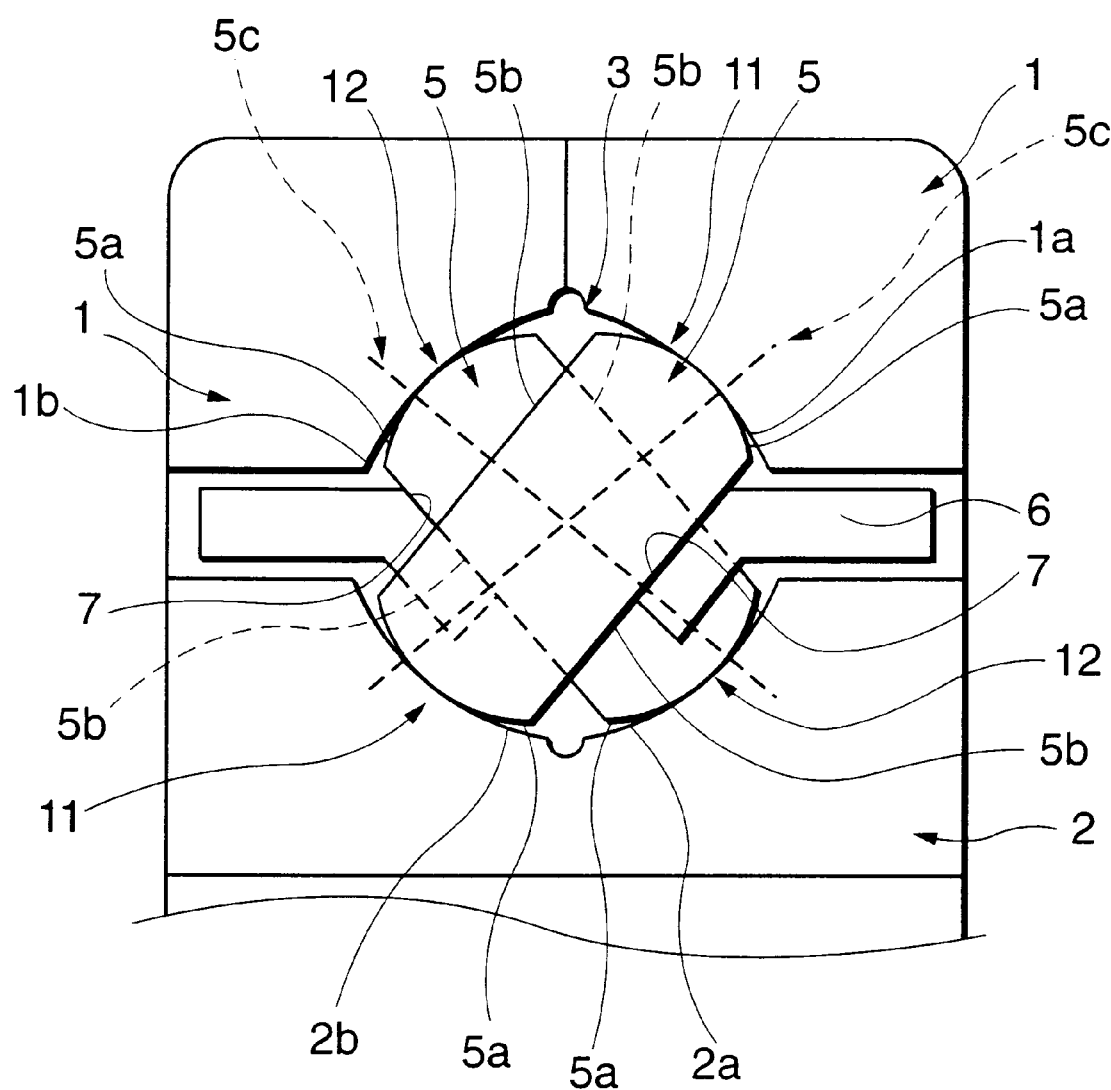
FIG. 4 is a longitudinal section view, omitted in part, of a rolling bearing according to a third embodiment of the invention.

Now, FIG. 4 shows a third embodiment of a rolling bearing according to the invention. In the present embodiment, instead of the integral outer race 1 and two divided inner races 2, 2 respectively employed in the first embodiment, there are employed two divided outer races 1, 1 and an integral inner race 2.

The other remaining structures and operation effects of the present embodiment are the same as those of the first embodiment.

Fourth Embodiment

Figure 5:
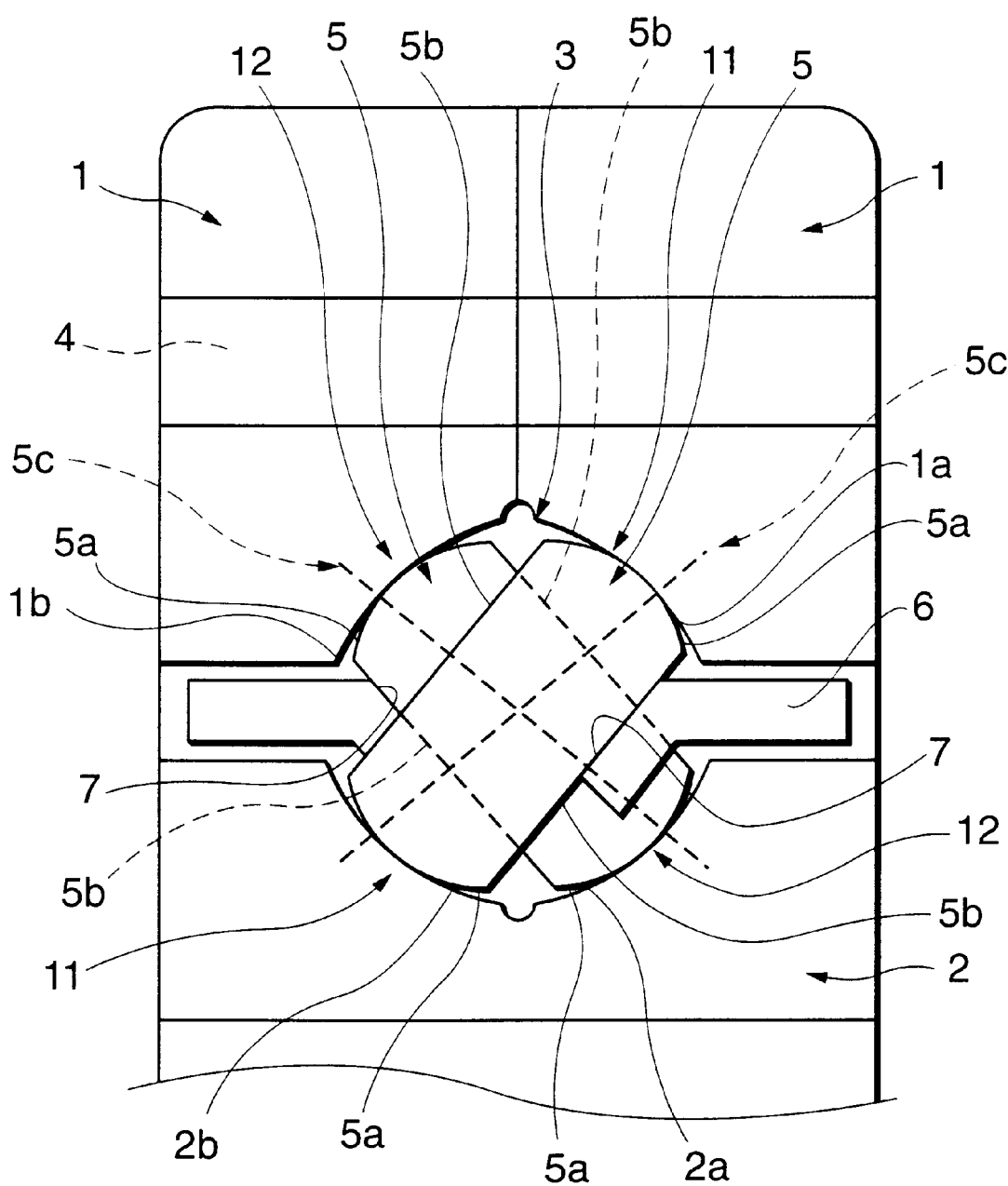
FIG. 5 is a longitudinal section view, omitted in part, of a rolling bearing according to a fourth embodiment of the invention.

Now, FIG. 5 shows a fourth embodiment of a rolling bearing according to the invention. In the present embodiment, the two divided outer races 1, 1 employed in the third embodiment are fixed together by a bolt or a rivet 4 to thereby eliminate the need for adjustment of a preload or a clearance between them.

The other remaining structures and operation effects of the present embodiment are the same as those of the first embodiment.

Fifth Embodiment

Figure 6:
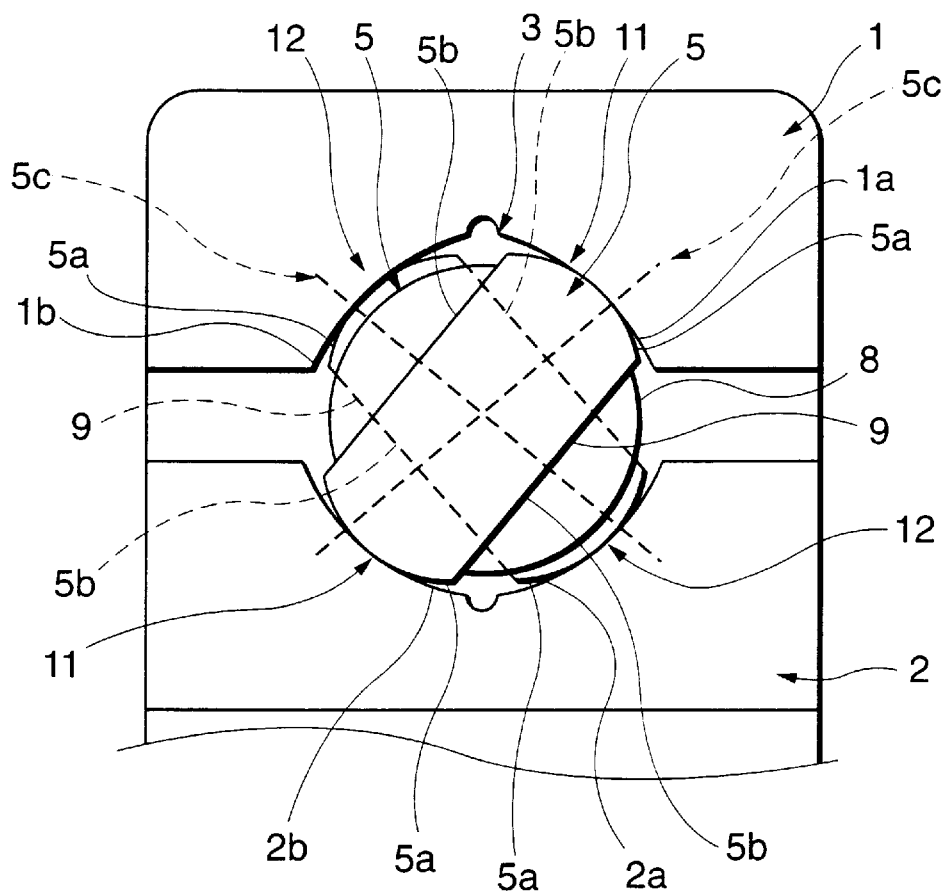
FIG. 6 is a longitudinal section view, omitted in part, of a rolling bearing according to a fifth embodiment of the invention.
Figure 7:
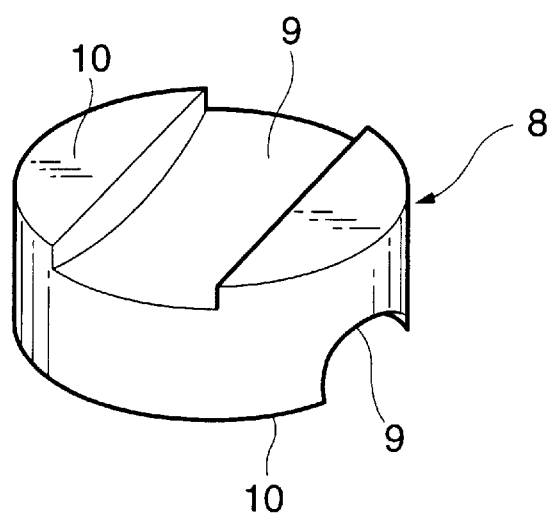
FIG. 7 is an enlarged perspective view of an embodiment of a separator employed in the invention.

Now, FIG. 6 shows a fifth embodiment of a rolling bearing according to the invention. In the present embodiment, as shown in FIG. 6, there are employed an integral outer race 1 and an integral inner race 2. In the outer race 1, there is formed a rolling element insertion hole. Also, instead of the retainer 6 used in the first embodiment, as shown enlargedly in FIG. 7, there is employed a separator 8; that is, the rolling elements 5, 5 are guided by the separator 8.

With use of this structure, the rolling bearing can be made more compact.

The other remaining structures and operation effects of the present embodiment are the same as those of the first embodiment.

The separator 8 has a diameter smaller than the diameter of each rolling element 5 and, in the two mutually opposing surfaces of the separator 8, there are formed recess-shaped arc grooves 9, 9 which are respectively used to hold the rolling elements 5, 5 in such a manner that, as described above, the rotation axes 5c, 5c thereof perpendicular to their associated mutually opposing surfaces 5b, 5b and 5b, 5b cross each other.

Sixth Embodiment

Figure 8:
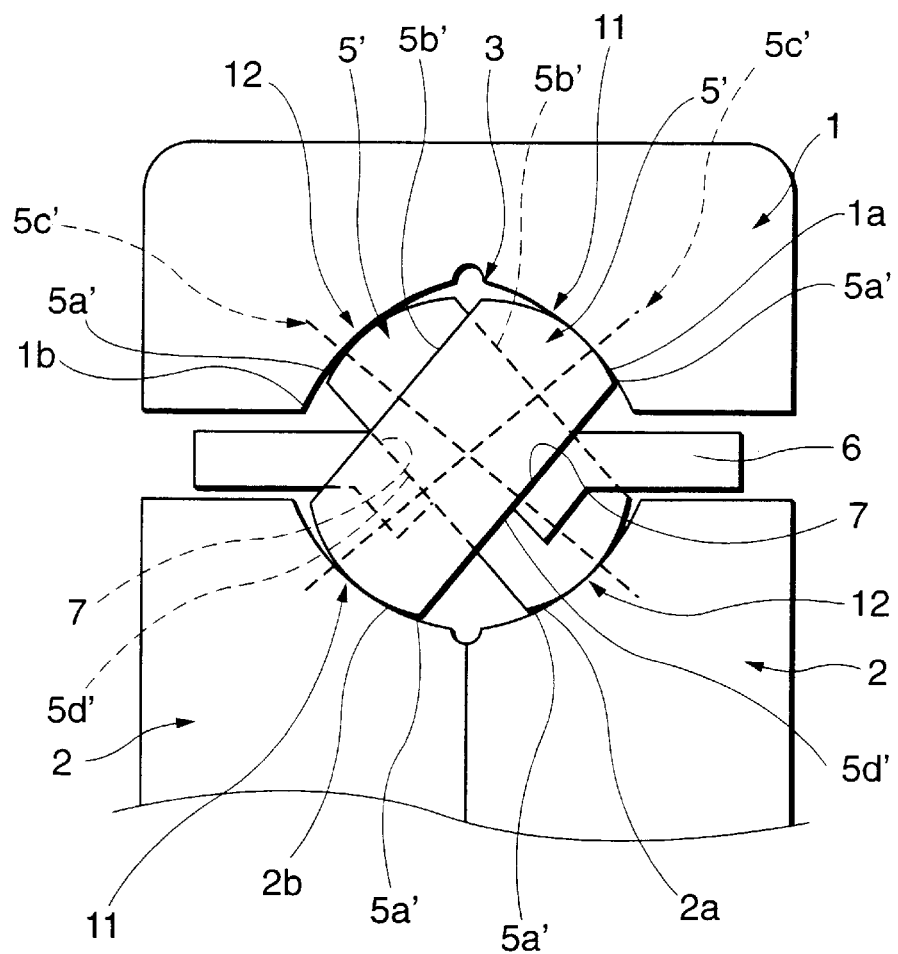
FIG. 8 is a longitudinal section view, omitted in part, of a rolling bearing according to a sixth embodiment of the invention.

Now, FIG. 8 a sixth embodiment of a rolling bearing according to the invention. The present embodiment is suitable for use in a high-speed rotation case.

Figure 9:
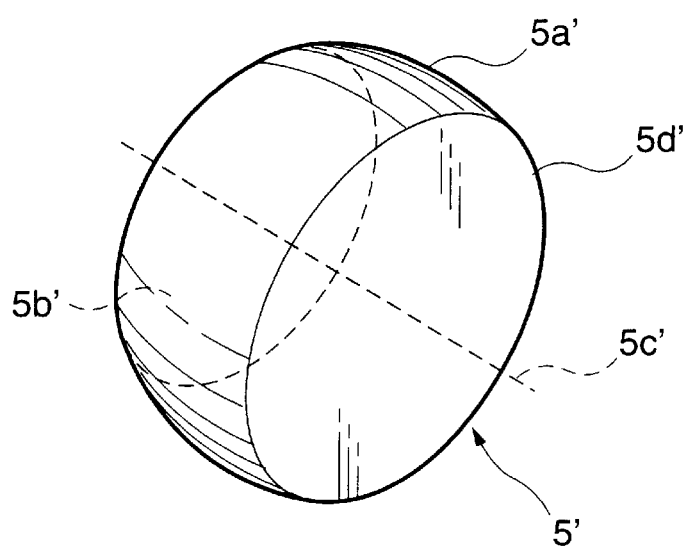
FIG. 9 is an enlarged perspective view of another embodiment of a rolling element employed in the invention.

In stead of the rolling element 5 including the two symmetric, mutually opposing surfaces 5b, 5b used in the first embodiment, there is employed a rolling element (a top-and-bottom-cut-shaped ball) 5' including two asymmetric, mutually opposing surfaces 5b', 5b' shown in FIG. 9, and the rolling element 5' is arranged in such a manner that the larger ends 5d' of the two mutually opposing surfaces 5b', 5b' thereof are disposed opposed to the inner race 2 of the present rolling bearing. With use of this structure, the rotation of the rolling element 5' can be stabilized further, which makes it possible to realize further reduced torque.

The other remaining structures and operation effects of the present embodiment are the same as those of the first embodiment.

Seventh Embodiment

Figure 10:
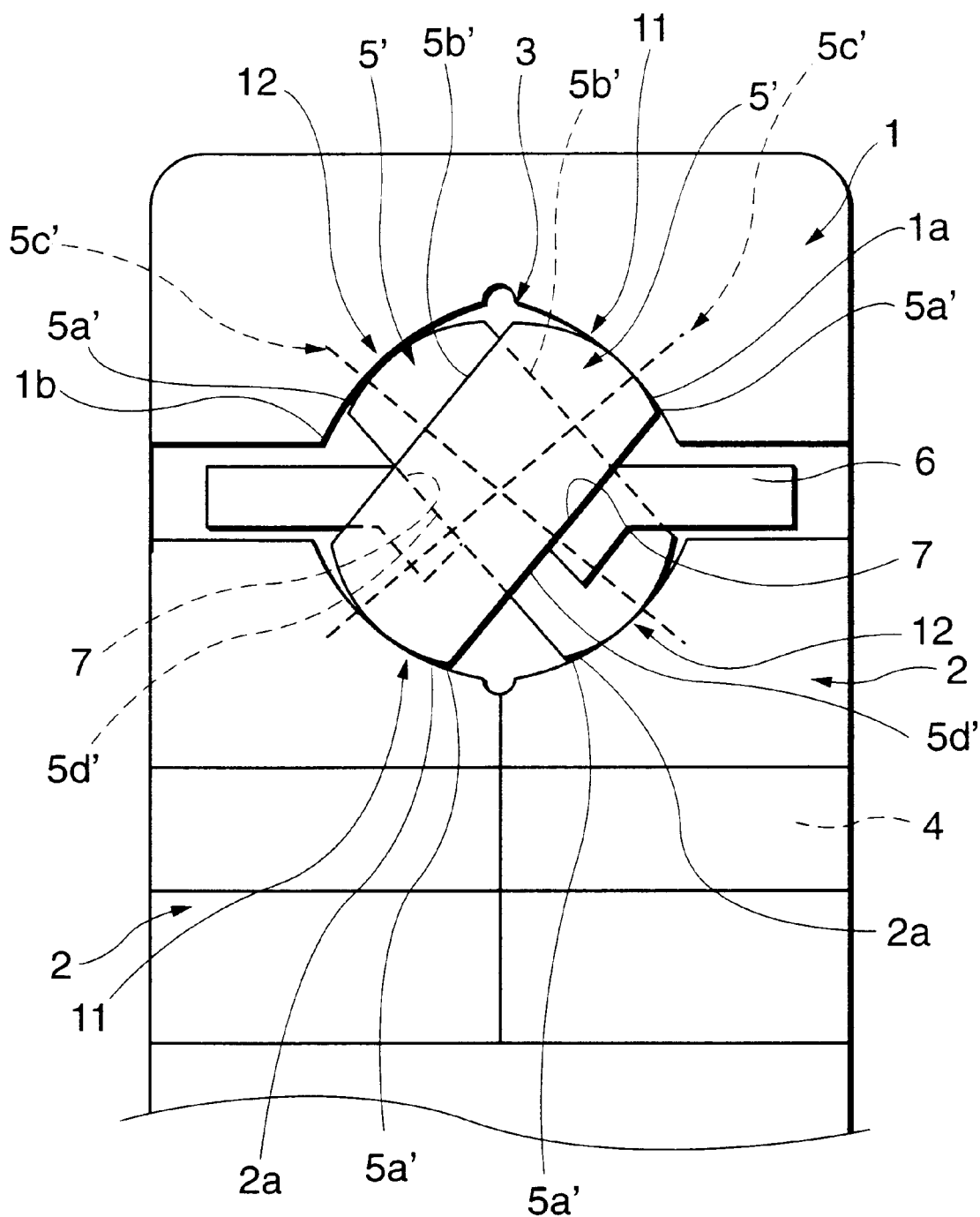
FIG. 10 is a longitudinal section view, omitted in part, of a rolling bearing according to a seventh embodiment of the invention.

Now, FIG. 10 shows a seventh embodiment of a rolling bearing according to the invention. In the present embodiment, the two divided inner races 2 and 2 are fixed together by a bolt or a rivet 4 to thereby eliminate the need for adjustment of a preload or a clearance between them.

The other remaining structures and operation effects of the present embodiment are the same as those of the sixth embodiment.

Eighth Embodiment

Figure 11:
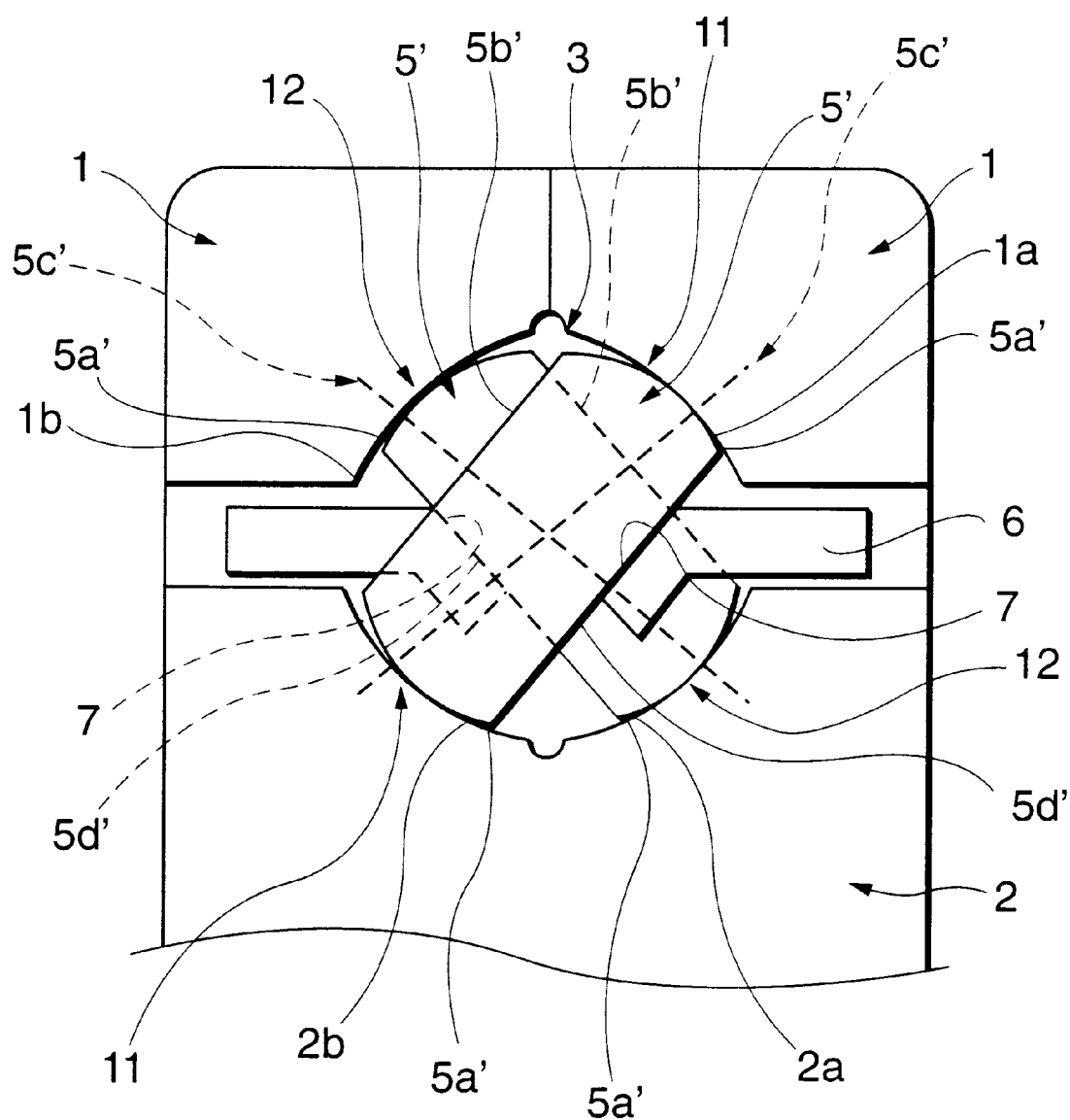
FIG. 11 is a longitudinal section view, omitted in part, of a rolling bearing according to an eighth embodiment of the invention.

Now, FIG. 11 shows an eighth embodiment of a rolling bearing according to the invention. In the present embodiment, instead of the integral outer race 1 and two divided inner races 2, 2 respectively employed in the first embodiment, there are employed two divided outer races 1, 1 and an integral inner race 2.

The other remaining structures and operation effects of the present embodiment are the same as those of the sixth embodiment.

Ninth Embodiment

Figure 12:
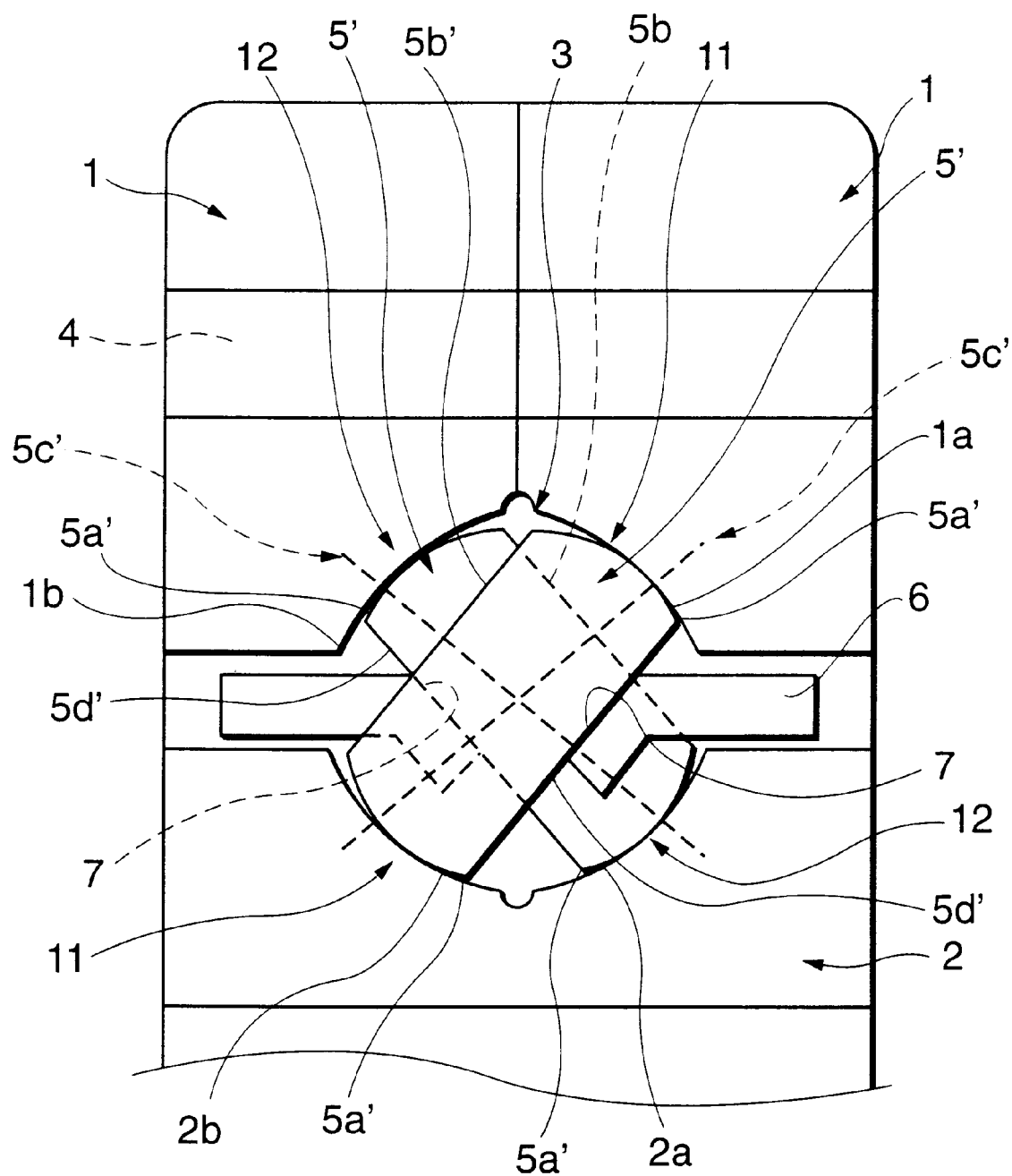
FIG. 12 is a longitudinal section view, omitted in part, of a rolling bearing according to a ninth embodiment of the invention.

Now, FIG. 12 shows a ninth embodiment of a rolling bearing according to the invention. In the present embodiment, the two divided outer races 1, 1 employed in the eighth embodiment are fixed together by a bolt or a rivet 4 to thereby eliminate the need for adjustment of a preload or a clearance between them. The other remaining structures and operation effects of the present embodiment are the same as those of the sixth embodiment.

Tenth Embodiment

Figure 13:
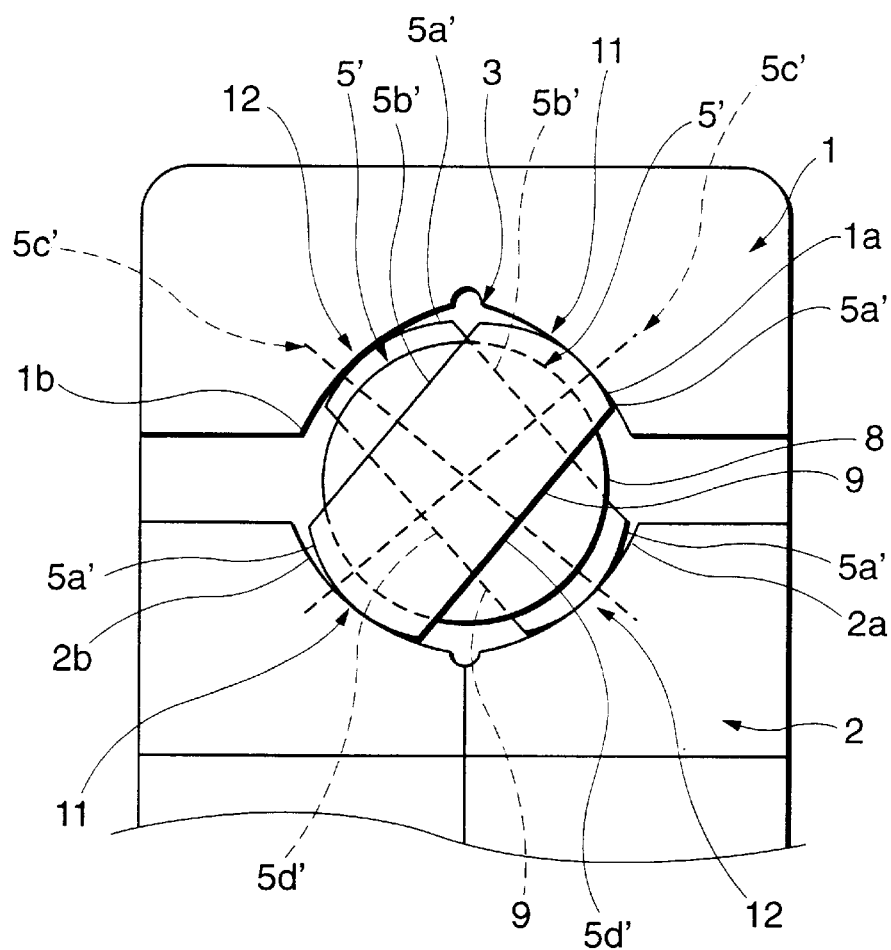
FIG. 13 is a longitudinal section view, omitted in part, of a rolling bearing according to a tenth embodiment of the invention.
Figure 14:
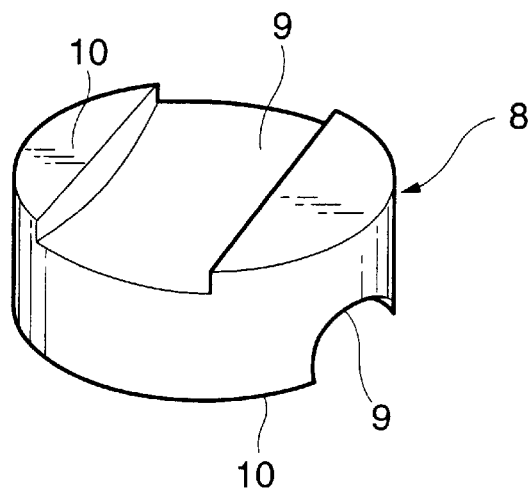
FIG. 14 is an enlarged perspective view of another embodiment of a separator employed in the invention.

Now, FIG. 13 shows a tenth embodiment of a rolling bearing according to the invention. In the present embodiment, as shown in FIG. 13, there are employed an integral outer race 1 and an integral inner race 2. In the outer race 1, there is formed a rolling element insertion hole. Also, instead of the retainer 6 used in the first embodiment, as shown enlargedly in FIG. 14, there is employed a separator (spacer) 8; that is, the rolling elements 5, 5 are guided by the separator 8. With use of this structure, the rolling bearing can be made more compact.

The other remaining structures and operation effects of the present embodiment are the same as those of the sixth embodiment.

Eleventh Embodiment

Figure 15:
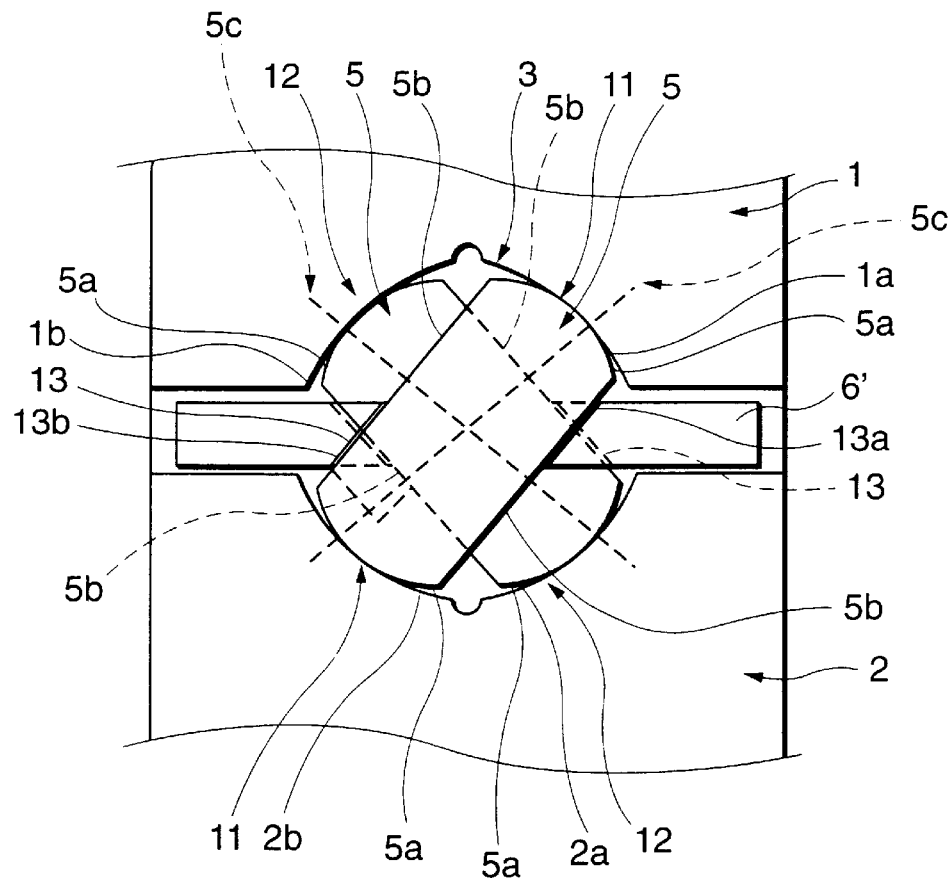
FIG. 15 is a longitudinal section view, omitted in part, of a rolling bearing according to a eleventh embodiment of the invention.
Figure 17:
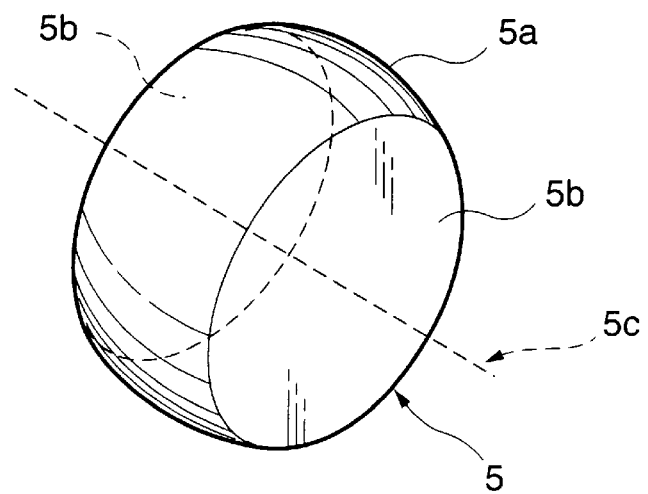
FIG. 17 is an enlarged perspective view of another embodiment of a rolling element employed in the invention.
Figure 16:
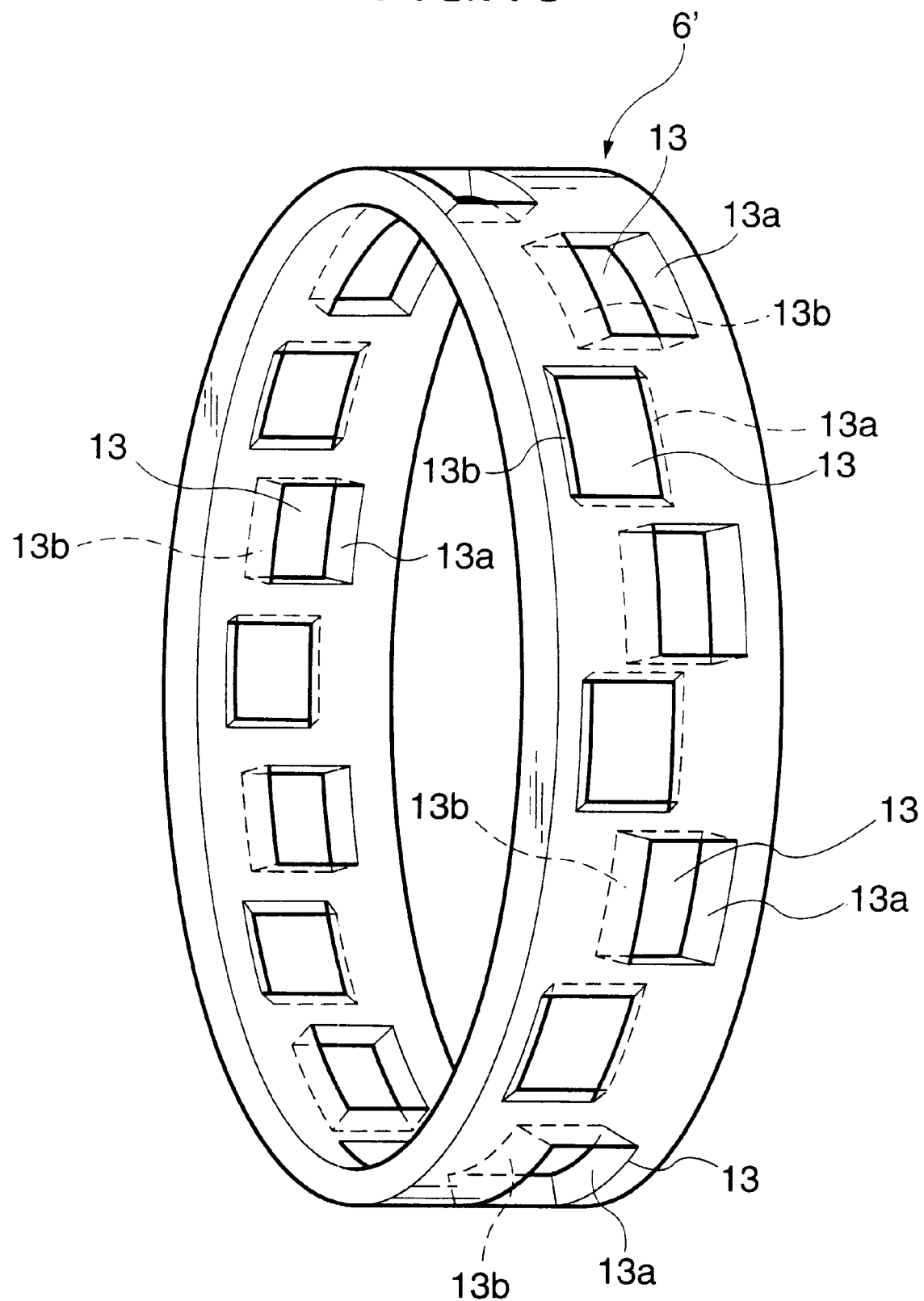
FIG. 16 is an enlarged perspective view of the other embodiment of a retainer employed in the invention.
Figure 18:
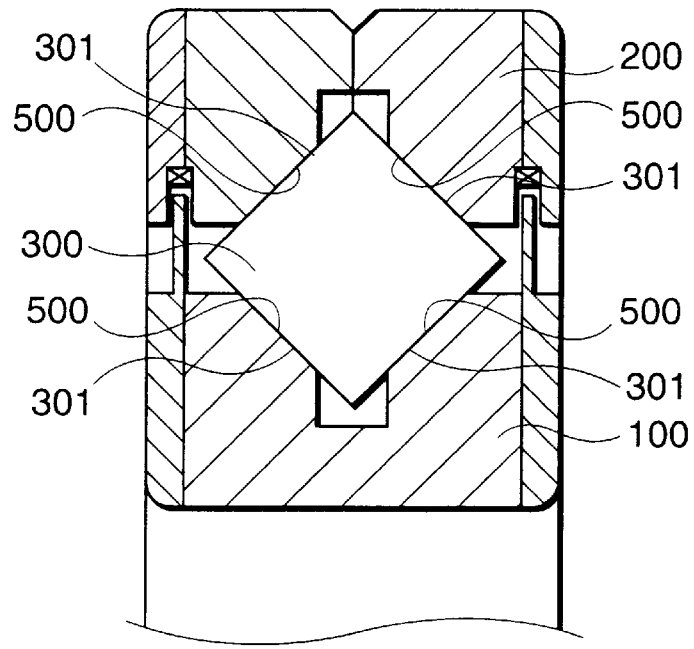
FIG. 18 is a longitudinal section view of a conventional cross roller bearing.
Figure 19:
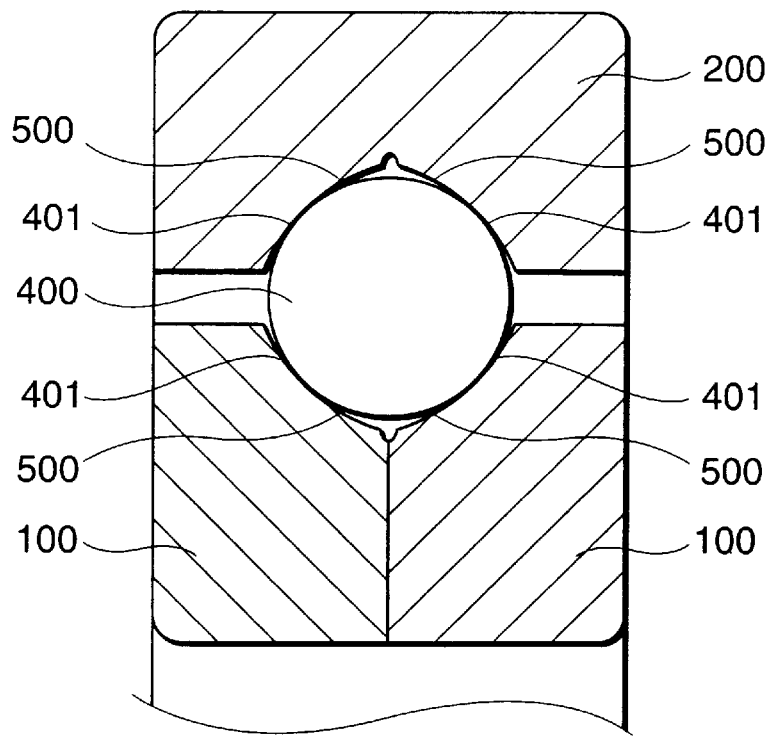
FIG. 19 is a longitudinal section view of a conventional four-point contact ball bearing.

Now, FIGS. 15 to 17 show a eleventh embodiment of a rolling bearing according to the invention. FIG. 15 is a longitudinal section view, omitted in part, of a rolling bearing according to the eleventh embodiment of the invention. FIG. 16 is an enlarged perspective view of one example of a retainer employed in the invention. FIG. 17 is an enlarged perspective view of one example of a rolling element employed in the invention;

In the rolling bearing of the eleventh embodiment, instead of a retainer 6 used in the first embodiment and so on, a machined retainer 6' (an annular-shaped retainer) as shown in FIG. 16 is used in such a manner that a holding posture of each rolling element 5 is kept maintained by the machined retainer 6'.

The retainer 6' has a number of pockets 13, - - - into which the same number of rolling elements 5, 5 are respectively inserted, while the rotation axes 5c, 5c of ones of the mutually adjoining rolling elements perpendicular to their associated mutually opposing surfaces 5b, 5b and 5b, 5b cross each other. The pockets 13, - - - are alternatively disposed on a periphery portion of the retainer 6' in a staggered manner and arranged in a predetermined interval in the circumferential direction thereof.

Both side surfaces 13a, 13b of each pocket 13 in the axial direction of the retainer 6' are extended in parallel with each other, but their extending directions thereof are neither in parallel with nor perpendicular to the axial direction of the rolling bearing. Namely, each of the extending directions defines a predetermined angle (inclined angle) relative to the axial direction of the rolling bearing while the predetermined angle (inclined angle) is set to a level substantially equal to a contact angle of the respective rolling element 5.

A distance between the side surfaces 13a, 13b is made slightly larger than a wide of the rolling element 5.

Note that the entire shape of each pocket is not limited to a specific one described above. The shape of the pocket can be modified, while keeping a construction that the pocket 13 has the parallel extending inclined side surfaces 13a, 13b and also a distance between the side surfaces 13a, 13b is set to be slightly larger than the width of the rolling element 5.

Although in the eleventh embodiment the rolling elements 5, - - - and the pockets 13, - - - , the total number of which is the same as the rolling elements, are respectively arranged at the predetermined interval in the circumferential direction and are alternatively arranged on the peripheral portion of the retainer 6' in the staggered manner, a configuration of the retainer according to the present invention is not limited to such a specific one. If the total number of the pockets is the same as the rolling elements, it is possible to modify the configuration in such a manner that the rotation axes 5c, 5c of the mutually adjoining ones of the rolling elements 5 may cross each other two to two; or they ay cross in the manner of two, one, one and two.

In addition, a material of the retainer 6' is not limited into specific one. For example, a metal material (for example, brass, steel or the like) or a synthetic resin (for example, polyamide 66 (nylon 66), polyphenylene sulfide (PPS) or the like) can be selectively utilized. Further, a guiding system of the retainer 6' is not limited to a specific one. An inner race guiding type, an outer race guiding type or a rolling element guiding type can be utilized. Furthermore, a construction of the retainer 6, 6' is not limited to a specific one. Not only a single unit type but also a divided race components type can be selectively utilized.

There is a possibility that a spinning or skewing of the rolling element is occurred during the rotation of the rolling element because of influence based on various kinds of factors. Accordingly, in the case where the rolling posture of the rolling element can not be controlled well, there is a possibility that a rotational resistance of the rolling bearing is increased and in turn a smooth rotation of the rolling element is deteriorated.

However, in the present invention, each pocket 13 of the retainer 6' has parallel extending inclined side surfaces 13a, 13b which are inclined relative to the axial direction of the rolling bearing at a predetermined angle which is substantially equal to the level of the contact angle of the rolling element 5. The side surfaces 13a, 13b can suppress the changing of the posture of the rolling element 5 which is caused by the spinning or the skewing of the rolling element 5, so that a posture of each rolling element can be maintained stable, to thereby realize reduced torque of the rolling bearing.

The other remaining structures and operation effects of the present embodiment are the same as those of the first to fourth embodiments and those of the sixth to ninth embodiments.

Namely, although in the embodiments above both of the outer race 1 and the inner race 2 are made of a single unit type, a construction of each race is not limited to such a specific one. It is possible to modify it in such a manner that one or both of the inner and outer races is made of a divided race components type wherein the race is divided into two components at a center position in the width direction, or that one or both of the inner and outer races is made of the divided race components type. As one example of the divided race components type, note that there is an assembled one which is made by coupling the divided race components through a bolt/rivet 4 into an assembled single unit.

In addition, although as shown in FIG. 17 the rolling elements 5 utilized in the eleventh embodiment are the same as that of the first embodiment, in stead of this, it is possible to replace the rolling elements 5 with the rolling element 5' used in the sixth to ninth embodiments. That is, there is employed a rolling element (a top-and-bottom-cut-shaped ball) 5' including two asymmetric, mutually opposing surfaces 5b', 5b' shown in FIG. 9, and the rolling element 5' is arranged in such a manner that the larger ends 5d' of the two mutually opposing surfaces 5b', 5b' thereof are disposed opposed to the inner race 2 of the present rolling bearing. With use of this structure, the rotation of the rolling element 5' can be stabilized further, which makes it possible to realize further reduced torque. According to the present invention, since it has the above-mentioned structure, a single bearing is able to receive a radial load, axial loads in two directions and a moment load.

Also, according to the present invention, in addition to the above effect, there can be further obtained the following effects:

That is, because the rolling elements are always contacted at two points with the raceway groove of the race thereof, it is possible to control an increase in torque which is caused by the large spin slippage of the ball in the conventional four-point contact bearing.

Also, since the rolling element is formed in such a manner that its outside diameter serving as its rolling contact surface has a curvature in the axial direction thereof as well, when compared with a cross roller bearing, the rolling resistance of the rolling element can be reduced, which makes it possible to realize low torque.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A rolling bearing comprising:
   a first race having a race way groove defined by two raceway surfaces;
   a second race mated with said first race, said second having a race way groove defined by two raceway surfaces; and
   a plurality of rolling elements rotatably incorporated between said first and second races, each of said rolling elements having a rolling contact peripheral surface defined by rotating a curved bus line about its rotation axes, said curved bus line having a sole predetermined curvature which is smaller than any one of the radius of raceway surfaces of said first and second races,
   wherein the rolling contact surface of each of said rolling elements is always contacted at two points with said raceway surfaces of said first and second races, said two points are consisted of a first point positioned at one of said two raceway surfaces of said first race and a second point positioned at one of said two raceway surfaces of said second race, and the mutually adjoining ones of said rolling elements are arranged in a circumferential direction of said rolling bearing in such a manner that their rotation axes are crossed each other alternately.

2. The rolling bearing according to claim 1, wherein each of said rolling elements comprises mutually opposing flat-surfaces which intersects perpendicular to the rotation axes thereof.

3. The rolling bearing according to claim 2, wherein each of said rolling elements is a top-and-bottom-cut-shaped ball which is formed by cutting upper and lower portions of a ball so as to define said mutually opposing flat-surfaces.

4. The rolling bearing according to claim 2, wherein each of said rolling elements is the top-and-bottom-cut-shaped ball which is formed by uniformly cutting upper and lower portions of a ball at a predetermined amount so as to define said mutually opposing flat-surfaces.

5. The rolling bearing according to claim 2, wherein the mutually opposing flat-surfaces of each of said rolling elements are set symmetric or asymmetric.

6. The rolling bearing according to claim 1, wherein said first race comprises a right race component having one of said two raceway surfaces and a left race component having the other of said two raceway surfaces, to thereby define the race way groove of said first race.

7. The rolling bearing according to claim 6, wherein said first race further comprises a bolt or a rivet which secures said right and left race components each other.

8. The rolling bearing according to claim 1, wherein said second race comprises a right race component having one of said two raceway surfaces and a left race component having the other of said two raceway surfaces, to thereby define the race way groove of said second race.

9. The rolling bearing according to claim 8, wherein said second race further comprises a bolt or a rivet which secures said right and left race components each other.

10. The rolling bearing according to claim 1, further comprising:
a retainer having alternately formed two hold portions into which the mutually adjoining rolling elements are incorporated in such a manner that the rotation axes of said mutually adjoining rolling elements cross each other alternately.

11. The rolling bearing according to claim 1, further comprising:
a plurality of separators each having a diameter smaller than the diameter of each rolling element and also having two recess-shaped arc grooves at its mutually opposing surfaces in a mutually crossing manner in such a manner that the rotation axes of said rolling elements cross each other.

12. The rolling bearing according to claim 1, further comprising:
a retainer having a number of pockets into which the same number of said rolling elements are respectively inserted, wherein said pockets are alternatively disposed on a periphery portion of said retainer in a staggered manner and arranged in a predetermined interval in the circumferential direction thereof.

13. The rolling bearing according to claim 12, wherein both side surfaces of each pocket in the axial direction of said retainer are extended in parallel with each other, but their extending directions are neither in parallel with nor perpendicular to the axial direction of said rolling bearing.

* * * * *